United States Patent
Poscher

(10) Patent No.: US 9,634,864 B2
(45) Date of Patent: Apr. 25, 2017

(54) DYNAMIC ADMISSION CONTROL FOR MEDIA GATEWAYS

(75) Inventor: Jens Poscher, Niederkruechten (DE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 831 days.

(21) Appl. No.: 12/676,896

(22) PCT Filed: Sep. 7, 2007

(86) PCT No.: PCT/EP2007/059418
§ 371 (c)(1),
(2), (4) Date: Mar. 6, 2010

(87) PCT Pub. No.: WO2009/030280
PCT Pub. Date: Mar. 12, 2009

(65) Prior Publication Data
US 2010/0303088 A1    Dec. 2, 2010

(51) Int. Cl.
*H04L 12/54* (2013.01)
*H04L 12/801* (2013.01)

(52) U.S. Cl.
CPC .......... *H04L 12/5695* (2013.01); *H04L 47/15* (2013.01)

(58) Field of Classification Search
CPC ... H04L 12/5695; H04L 47/822; H04L 65/80; H04L 47/801; H04L 29/06027; H04L 47/11; H04L 47/29; H04L 47/762; H04L 47/825; H04L 43/16; H04L 45/22;
(Continued)

(56) References Cited

U.S. PATENT DOCUMENTS 7,088,677 B1 *   8/2006   Burst, Jr. ...................... 370/229
7,260,060 B1 *   8/2007   Abaye ................... H04W 28/16
                                                          370/230

(Continued)

FOREIGN PATENT DOCUMENTS

EP   1 154 663 A    11/2001
EP   1 168 755 A1    1/2002

(Continued)

OTHER PUBLICATIONS

3GPP TS 29.414 V9.0.0; 3rd Generation Partnership Project; Technical Specification Group Core Network and Terminals; Core network Nb data transport and transport signalling (Release 9); Dec. 2009.

*Primary Examiner* — Chi H Pham
*Assistant Examiner* — Lionel Preval
(74) *Attorney, Agent, or Firm* — Patents on Demand P.A.; Brian K. Buchheit; Scott M. Garrett

(57) ABSTRACT

A Media Gateway, in connection to a backbone, measures a packet loss and/or jitter, receives a call and notices an indication that a higher packet loss and/or jitter is acceptable. The Media Gateway decides, based on said measured packet loss or jitter and said indication, whether the call is admitted to be routed via said backbone even though the packet loss or jitter is above a predefined threshold. A Mobile Switching Centre Server in connection to a backbone, receives a call set-up, detects that a call set-up should be performed by a Media Gateway even if the packet loss or jitter is above a predefined threshold, and provides an indication to the Media Gateway that a higher packet loss or jitter is acceptable.

20 Claims, 5 Drawing Sheets

(58) Field of Classification Search
CPC ..... H04L 45/50; H04L 47/805; H04L 47/826; H04L 43/00; H04L 43/0882; H04L 43/10
USPC ....... 370/401, 335, 230, 253, 395.21, 395.2, 370/229, 352; 455/453; 379/32.01
See application file for complete search history.

(56) References Cited

U.S. PATENT DOCUMENTS

| | | | |
|---|---|---|---|
| 2004/0009776 A1* | 1/2004 | Ishikawa | H04L 12/5695 455/453 |
| 2005/0195741 A1* | 9/2005 | Doshi | H04L 47/825 370/230 |
| 2005/0201336 A1* | 9/2005 | Lee | 370/335 |
| 2006/0067298 A1* | 3/2006 | Houck | H04L 47/825 370/352 |
| 2007/0025248 A1* | 2/2007 | Freytsis et al. | 370/230 |
| 2008/0062997 A1* | 3/2008 | Nix | 370/395.2 |
| 2008/0095173 A1* | 4/2008 | Bugenhagen | 370/395.21 |
| 2009/0245129 A1* | 10/2009 | Pongracz et al. | 370/253 |
| 2012/0201360 A1* | 8/2012 | Bugenhagen | H04L 1/0001 379/32.01 |

FOREIGN PATENT DOCUMENTS

| | | |
|---|---|---|
| EP | 1 244 318 A | 9/2002 |
| EP | 1370033 A | 12/2003 |
| EP | 1641232 A | 3/2006 |
| WO | 98/31177 A | 7/1998 |
| WO | 03/077582 A | 9/2003 |
| WO | WO 2004/092927 A2 | 10/2004 |
| WO | 2004/102919 A | 11/2004 |

* cited by examiner

DYNAMIC ADMISSION CONTROL FOR MEDIA GATEWAYS

TECHNICAL FIELD

The invention relates to the field of Telecommunication in general and more specifically to the field of admission control for Media Gateways.

BACKGROUND

In today's implementation of legacy transmission technologies of Core Networks, Time Division Multiplex (TDM) and Asynchronous Transfer Mode (ATM) technologies are typically used for voice communication. However, recent developments also make use of Internet Protocol (IP) based technologies.

In TDM and ATM based networks a predefined number of devices or time slots is provided exclusive for a single connection. Therefore, if all devices/time slots are used no further connection can be established. For this reason no more connections are admitted.

In contrast thereto, in IP based systems the connections share the available capacity of the IP network. A connection is consequently no longer characterized by a specific device or time slot but by a packet loss and/or jitter etc. Without any Admission Control any request for establishing a connection would be allowable, leading to a possible situation, that due to the sharing of the network, packets are lost e.g. in an over load case. This packet loss contributes to a disturbed connection, which—at a certain point—is no longer acceptable.

Therefore, an Admission Control is established which based on a measured packet loss provides for a measurement based admission Control (MBAC). The MBAC operates on a system level, typically on a Media Gateway, measuring the packet loss per site, i.e. per connected Media Gateway(s). If with respect to a Media Gateway a certain level of packet loss is reached or exceeded no further calls are admitted for that site. Such systems are known for example from U.S. Pat. No. 6,728,270 B1 and U.S. Pat. No. 6,614,790 B1, both assigned to the applicant.

Recent development show that the known systems allow for providing connections in a "moderate" environment on a "global" level for all connections served by a Media Gateway. However, they are inflexible to some extent in that they do neither allow for individual settings nor for an adaptive control of providing connections.

SUMMARY

It is therefore an object of the invention to provide methods and systems allowing for a flexible admission control.

Therefore, it is proposed to implement a Method for a Media Gateway, which is in connection to a backbone. The Media Gateway measures a packet loss. Traditionally, if the measured packet loss is above a predefined threshold no further call is admitted to be routed via the backbone.

Said predefined threshold is predefined on Media Gateway Level, e.g. by an Operation Support System (OSS) as indicated in FIGS. 1 and 1a connected via an appropriate control as indicated by dotted lines, or might be supplied within said indications.

However, the Media Gateway notices an indication that a higher packet loss is acceptable and therefore is able to decide based on said measured packet loss and said indication whether said call is admitted to be routed via said backbone even though the packet loss is above said predefined threshold. The decision might be positive if the measured packet loss is below a further predefined packet loss or negative if the measured packet loss is above said further predefined packet loss.

Such an indication might be received from a Mobile Switching Centre Server and/or might be received from a calendar.

Said indication originating from a Mobile Switching Center Server is based on that the Mobile Switching Center Server receives a call set-up and thereupon detects that a call set-up should be performed by a Media Gateway even if the packet loss is above a predefined threshold. Consequently, the Mobile Switching Center Server provides an indication towards said Media Gateway that a higher packet loss is acceptable.

In an embodiment of the invention said indication is received in a GCP message.

An exemplary indication is a priority value within a GCP message.

In a further embodiment of the invention said GCP message is a context request.

Said indication originating from a calendar includes any kind of calendar which provides the Media Gateway with the indication that either for a specific time or from a specific point in time on either a higher packet loss or lower packet loss is acceptable.

In a further embodiment of the invention, the Media Gateway decides to route said call through a second backbone which is also connected to the media gateway if said different backbone provides for more appropriate packet loss than the first backbone.

In still a further embodiment, the Media Gateway may change an QoS class associated to a call, which typically will lead to a changed forwarding behavior in the corresponding backbone, e.g. a change of a forwarding queue or Packet Loss Priority associated to a call.

As already indicated, said indication may originate from a Mobile Switching Center Server. Then the indication is based on that the Mobile Switching Center Server receives a call set-up and thereupon detects that a call set-up should be performed by a Media Gateway even if the packet loss is above a predefined threshold. Consequently, the Mobile Switching Center Server provides an indication towards said Media Gateway that a higher packet loss is acceptable.

The detection may be based on a measured call set-up gradient by analyzing call set-up events over time. If the call gradient rises above a predefined value, the indication is provided towards the Media Gateway.

In a further embodiment of a Mobile Switching Center Server (MSC-S), the Mobile Switching Center Server receives an indication that a higher packet loss for the originator of said call is acceptable and/or that a higher packet loss for the destination of said call is acceptable.

These features are advantageous because they allow for a flexible admission control which ensures that calls are permitted which traditionally would not be admitted.

Obviously, two or more stages of packet loss could be defined allowing for even more granularity in the admission control.

Furthermore, by combining several kinds of indication a flexible system based on general and personal preferences can be achieved.

E.g. general preferences might be based on calendar events like new years eve, sport events, etc., destination specific, e.g. polls, etc which are taken into account by a operator or by personal preferences such as for example subscription specific, e.g. communication is of such an importance that even a degraded (voice) or slow (data) communication is accepted, or a low rate subscriber which has to accept lower quality.

It is further proposed to provide devices corresponding to the above described methods.

BRIEF DESCRIPTION OF THE DRAWINGS

For the purpose of illustrating various features according to the invention, we will refer in the following to figures which show on FIGS. 1 and 1a exemplary setups of networks involving network nodes according to the invention.

DETAILED DESCRIPTION

In the following the invention is described in more detail by means of examples and in view of the drawings. Consequently, the following examples are meant as explanatory and not limiting the invention to a particular example.

Gateway Control Protocol (GCP), H.248 and MeGaCo (Media Gateway Control Protocol) are used throughout the application as synonyms to each other and as examples of a suitable protocol offering control.

Furthermore, although in the following the invention is described with reference to packet loss as a criterion for admission control, the invention also encompasses the use of jitter and jitter measurements and the like as alternative criterion or supplemental criterion.

Figure 1:
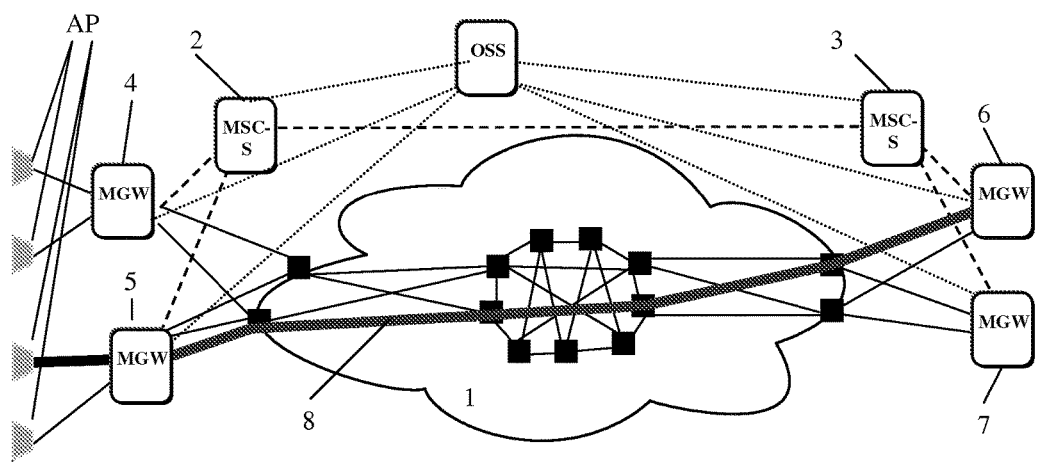
Figure 1A:
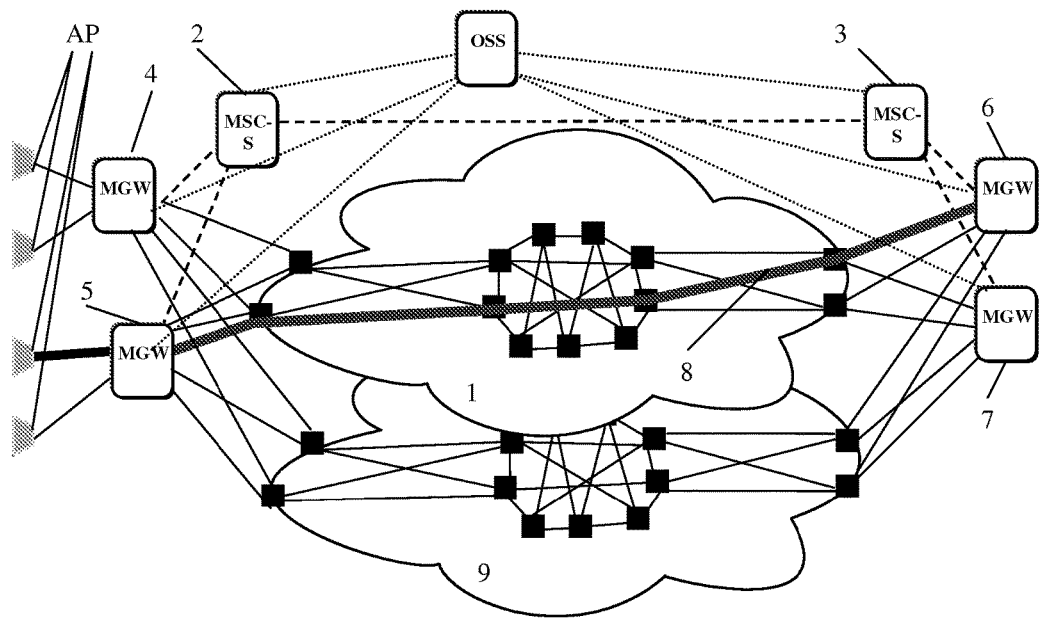

FIGS. 1 and 1a show exemplary setups of networks involving network nodes according to the invention.

In these networks Media Gateways (MGW) 4, 5, 6, 7 are connected by means of one or more backbones 1, 9. Furthermore, the Media Gateways are connected to Mobile Switching Centre Servers 2, 3. Obviously the number of Media Gateways 4, 5, 6, 7, the number of Mobile Switching Centre Servers 2, 3 and the number of backbones 1, 9 might be of any suitable size.

Within the FIGS. 1 and 1a, each Media Gateway is controlled by a respective Mobile Switching Centre Server (MSC-S), i.e. Media Gateway 4 is controlled by Mobile Switching Centre Server 2.

In order to distinguish connectivity layer from the network control layer offering a User Control Layer and a Call Control Layer, in FIGS. 1 and 1a dashed lines are used for the network control layer whereas solid lines are used for the connectivity layer.

A backbone may comprise several entities e.g. routers, bridges, switches, gateways as indicated by black squares within the backbone clouds 1, 9. Further details on the backbone are for the understanding of the invention not necessary.

Assume now that a connection 8, e.g. via an Access Node (AP) as indicated by rhombohedral boxes in FIG. 1 such as an RNC in the case of a mobile communications network, is along the thick solid line via Media Gateway 5 through backbone 1 towards Media Gateway 6.

Typically, Media Gateways 5, 6 are measuring during an ongoing call the Packet loss per Media Gateway. I.e. if a certain number of packets, e.g. a Real Time Protocol (RTP) packet loss of $10^{-4}$ on the connection 8 are lost in the backbone 1 than no further calls are accepted for that site. Obviously, this might happen on both ends independently, e.g. at Media Gateway 5 or at Media Gateway 6.

Furthermore, as already indicated, another criterion could be jitter and the like as alternative criterion or supplemental criterion for deciding whether further calls are accepted for that site.

If a further call set-up is received for a site which has a reported packet loss above said certain number and/or a reported jitter above a certain threshold, the admission control rejects said call set-up, e.g. if MGW 5 measures a packet loss above the threshold for MGW 6, MGW 5 will reject calls being routed towards MGW 6.

However, in a Media Gateway according to the invention, admission control provides a different approach.

Still, a packet loss and/or a jitter or the like is measured in step 200. However, once a call set-up is received in step 300, it is checked in step 400 whether an indication regarding that a higher packet loss and/or higher jitter is acceptable is noticed or not.

Such indication(s) might have been received from an internal source in step 350 and/or from an external source in step 360.

An Internal Source might be a calendar functionality which is implemented for example by means of a Real Time Clock, whereas an External Source might be a Mobile Switching Centre Server providing an indication via a message such as a call set-up message. Hence, even in a received call set-up according to step 300 an indication according to step 360 might be included making a separate reception of such an indication obsolete. Although only one indication is mentioned in the following, it is envisaged to have more than one indication allowing for a more granular decision.

Obviously, the steps 200, 300, 350, 360 and 400 may be performed in any appropriate order, i.e. without any harm the group of step 350 and/or 360 and 400, and the steps 200 and 300 may be arranged differently, e.g. the indication might be received before receiving a call set-up 300 or even before measuring packet loss in step 200.

In step 600 it is now decided whether the call corresponding to said received call set-up is admitted or rejected.

This decision might be based on one or more parameters, i.e. whether an indication that a higher packet loss and/or higher jitter is acceptable is received from either an internal or external source or whether such indications are received from both external and internal sources.

In an embodiment the decision might be binary, i.e. either to admit the call in step 613 (Yes-Branch) or to reject the call in step 620 (No-Branch). In other embodiments, the decision might be more advanced taking into account several indications and also leading to "intermediate" decisions, i.e. that a call is admitted in step 610 but subject to a specific handling, i.e. routing via a different backbone or the like.

The decision might be based on a further requirement for the packet loss and/or jitter or the like, e.g. that it does not exceed a further value, e.g. reaching a Real Time Protocol (RTP) packets loss of $10^{-2}$, no further calls are accepted for that site. This second value might be predefined on Media Gateway Level, e.g. by an Operation Support System (OSS)

as indicated in FIGS. 1 and 1a connected via an appropriate control indicated by dotted lines, or might be supplied within said indications.

In further embodiments, the admitted call might be subject to a Change of QoS class in step 700/710 before the call is set-up as known in the prior art.

By changing the QoS class associated to a call, the corresponding backbone is instructed to change the forwarding behavior, e.g. to change a Packet Loss Priority associated to a call. Thereby it is ensured that the call is handled at an appropriate quality, e.g. a lower quality.

Therefore, even though such a call would traditionally be rejected, it is now admitted although there is a risk of degraded communication.

The mechanisms of step 700/710 can be used in both ways either to change the QoS class to a higher or to a lower class thereby instructing to change the packet loss priority to a higher or lower priority.

As already indicated, several kinds of indications are provisioned which could be employed independently from each other.

In a first embodiment, the indication is generated by an internal source such as a calendar. The calendar may provide an indication that from now on calls might be admitted if they exceed a first value(s) of a packet loss and/or higher jitter while not exceeding a second one(s). Obviously, there could be more than one second value for a packet loss and/or jitter i.e. a number of values which might be set appropriately.

In doing so, one could thereby define certain periods in which a higher packet loss and/or higher jitter is acceptable. E.g. on new years eve, typically a high number of subscribers like to call. At this point in time, subscribers typically would accept a degraded communication while being able to communicate at all. There exist a large number of planable events like the above which could be on a national, regional or urban scale, e.g. sports events, concerts, fairs, etc. which typically are accompanied by a higher demand for communication. Another planable event could be a promotion by an operator, e.g. free-calls in a certain period of time.

As indicated, the notice might be received in a binary manner, e.g. toggling a flag within the Media Gateway, or might be provided with more details e.g. a packet loss correspondence which is held to be acceptable. This correspondence might be an indication referring to a number of preset packet loss values and/or jitter within the Media Gateway, e.g. a byte, or a value indicating in a manner allowing for calculating the value of packet loss and/or jitter, e.g. the power of 10, or the value itself. Such preset values might also be administered by means of an OSS.

Obviously, such a calendar function needs not necessarily to be implemented within the Media Gateway itself but could also be located on other nodes of a network such as a Mobile Switching Centre Server or OSS. In that case, the indication is received from an external source in step 360. Obviously, all options as explained above are available in such an embodiment as well.

The calendar based indication as described above might be provided either on a general level, i.e. an indication which is valid for a period of time or might be provided on a call basis, i.e. for each call the indication is noticed again.

Furthermore, a Mobile Switching Centre Server may also detect that a higher packet loss and/or higher jitter would be acceptable and provide a corresponding indication to a Media Gateway, see step 360.

Such detection within a Mobile Switching Centre Server may be based on measurement and/or indications received from databases and/or calendars and will be describer later in connection with FIG. 3 and FIG. 4.

Embodiments of an Indication provided by an External Source towards the Media Gateway are contemplating that for certain subscribers and/or certain destinations a higher packet loss and/or higher jitter would be acceptable.

For example, certain subscribers might accept a lower quality either for having the possibility to communicate also under adverse conditions or subscribers may have opted for a flat rate which is packaged with a lower quality.

Furthermore, there exist a number of destinations for which a lower quality/higher packer loss is acceptable. These destinations include announcement services, polls, and any kind of non-interactive service. There, typically a lower quality is acceptable, because either the announcement is repeated, e.g. weather service, or, apart from the Announcement, e.g. that the poll was received, no further info will be provided.

Further details on how a measurement based detection may be implemented will be presented later on.

To provide for these calls with a more precise admission control, it is envisaged that a Mobile Switching Centre Server receives corresponding information for the subscriber and/or the destination from an appropriate database. Such information could easily be stored in and retrieved from a Home Location Register (HLR), a Visitor Location Register (VLR) or a Home Subscriber Server (HSS), see FIG. 4. Obviously, some of those databases, such as a VLR, may also be integrated into the Mobile Switching Centre Server.

Figure 2:
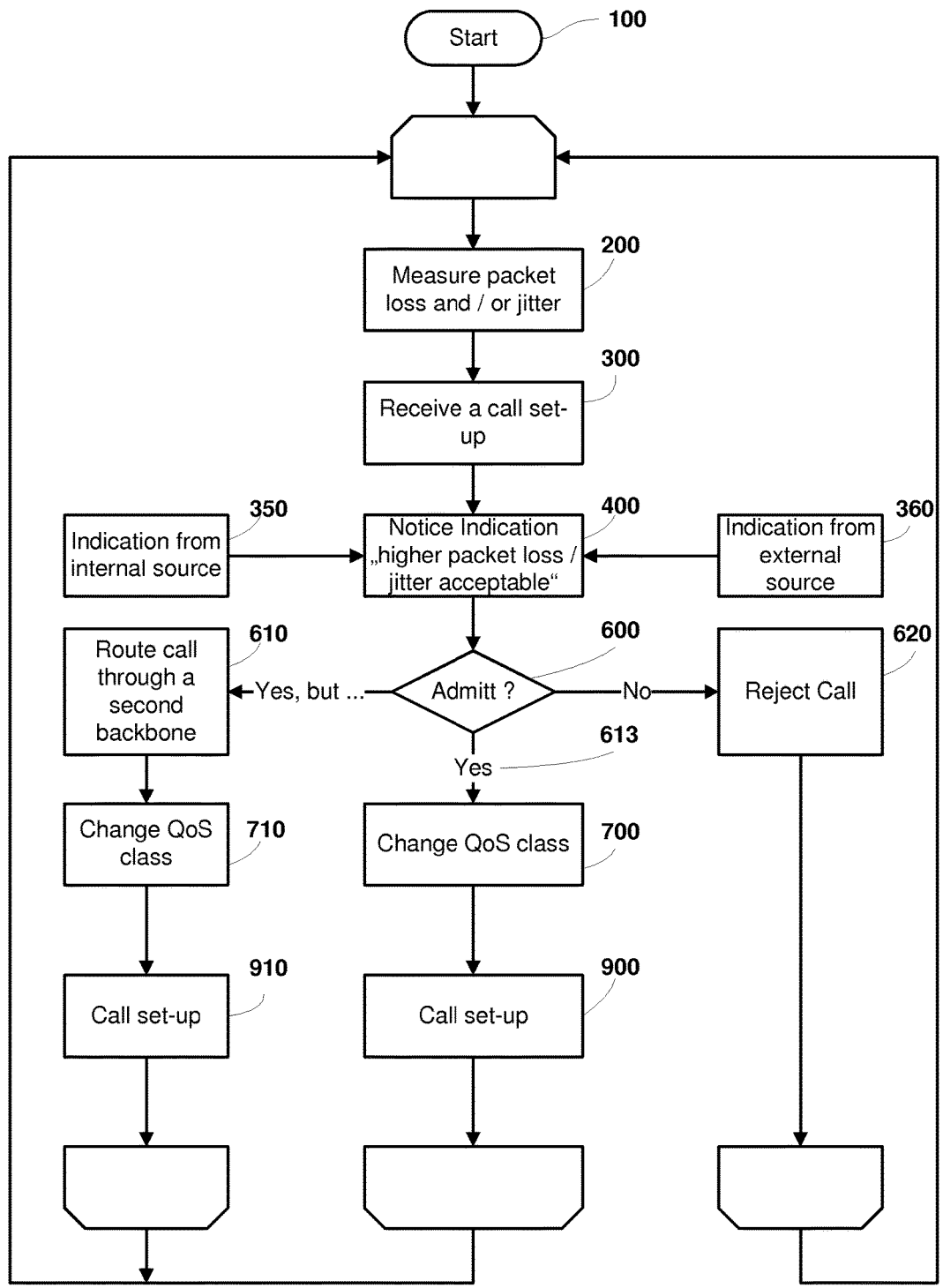
FIG. 2 a flow chart illustrating various embodiments of method steps of the invention performed by a Media Gateway.

As indicated in FIG. 2, by using several kinds of indication an advanced admit control in step 600 could be implemented which allows a Media Gateway also for deciding to route a call through a further/second backbone 9 as indicated in step 610.

For example, if the subscriber is a premium customer, then this might be used as an indication that the call needs to be transferred via a second backbone 9 which offers a better quality but which would not be used for an ordinary subscriber since the usage of the second backbone might involve higher costs, e.g. it is a backbone of another provider. In the above case one could assume that at a certain point in time an indication of an internal source, e.g. a calendar, indicates that a higher packet loss is acceptable while an indication from an external source indicates that for the subscriber high reliability is required.

In another example, if the indication from the external source is that the call is an emergency call than the call might be as well routed through a second backbone in order to ensure that the emergency call will get through.

In still another example, if the indication from the external source is that the destination is a low quality service such as a poll, announcement, then the call might be admitted even if the packet loss and/or jitter is above a predefined value or routed through the internet.

Obviously, if a call is routed through a second backbone the same mechanism as described above for changing a QoS class in a step 710 for instructing to change a packet loss priority is envisaged for a call set-up via said second backbone 9.

The mechanisms of steps 700 and 710 can be used in both ways either to change class to a higher or to a lower class thereby instructing to change the packet loss priority to a higher or lower priority.

Other scenarios will be apparent to those skilled in the art.

In the following, several kinds of methods will be presented directed to Mobile Switching Center Servers for providing an indication that a higher packet loss and/or jitter is acceptable towards a corresponding Media Gateway.

Figure 3:
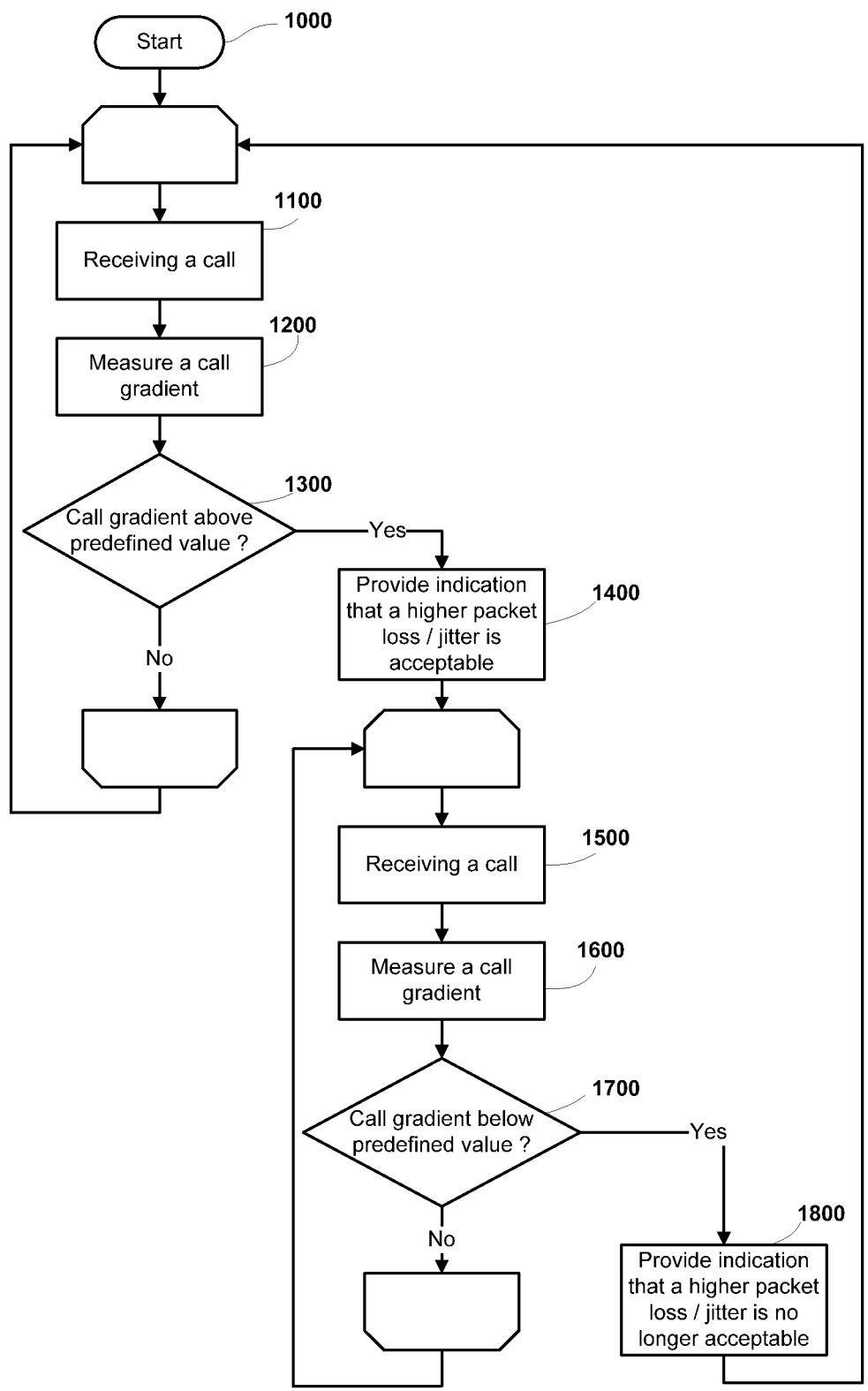
FIG. 3 a flow chart illustrating various embodiments of method steps of the invention performed by a Mobile Switching Center Server.

First of all, a measurement based detection will be illustrated by means of FIG. 3.

The method in its essence is based on the knowledge that certain events, like the ones already addressed above with respect to a calendar, as well as other events, e.g. a disaster, are characterized by a specific call set-up profile which could be expressed as a sharp increase in call set-ups within a short time.

Hence, if one measures how many call set-ups are made within a specified period of time, the gradient "call-set-ups/time" is an appropriate measure to detect these conditions without needing to administer a calendar.

Therefore, one could implement an exemplary method as follows. An exemplary method comprises the step of receiving a call in step 1100, detecting in step 1300 that a call set-up should be performed by a Media Gateway even if the packet loss and/or jitter is above a predefined threshold, and the step 1400 of providing an indication towards a corresponding Media Gateway 2, 3 or further entities that a higher packet loss is acceptable.

Beforehand of the step of detecting 1300, a step of measuring 1200 a call gradient by analyzing call set-up events over time, as described above can be foreseen, followed by that the step of detecting 1300 is characterized that it is detected that said gradient is above a predefined value.

Obviously, in the case where the indication is generated on a general and not on a call level, preferably a way to indicate towards a Media Gateway or further entities that a higher packet loss is no longer acceptable is envisaged as well.

This might be embodied according to steps 1500 to 1800 in the opposite manner as described with respect to steps 1100 to 1400, i.e. if the call gradient returns below a predefined value than this could be used again as an indication that from now on the special condition(s) are no longer valid, and that for a next call the admittance control of the Media Gateway should resume to it's normal procedure.

Figure 4:
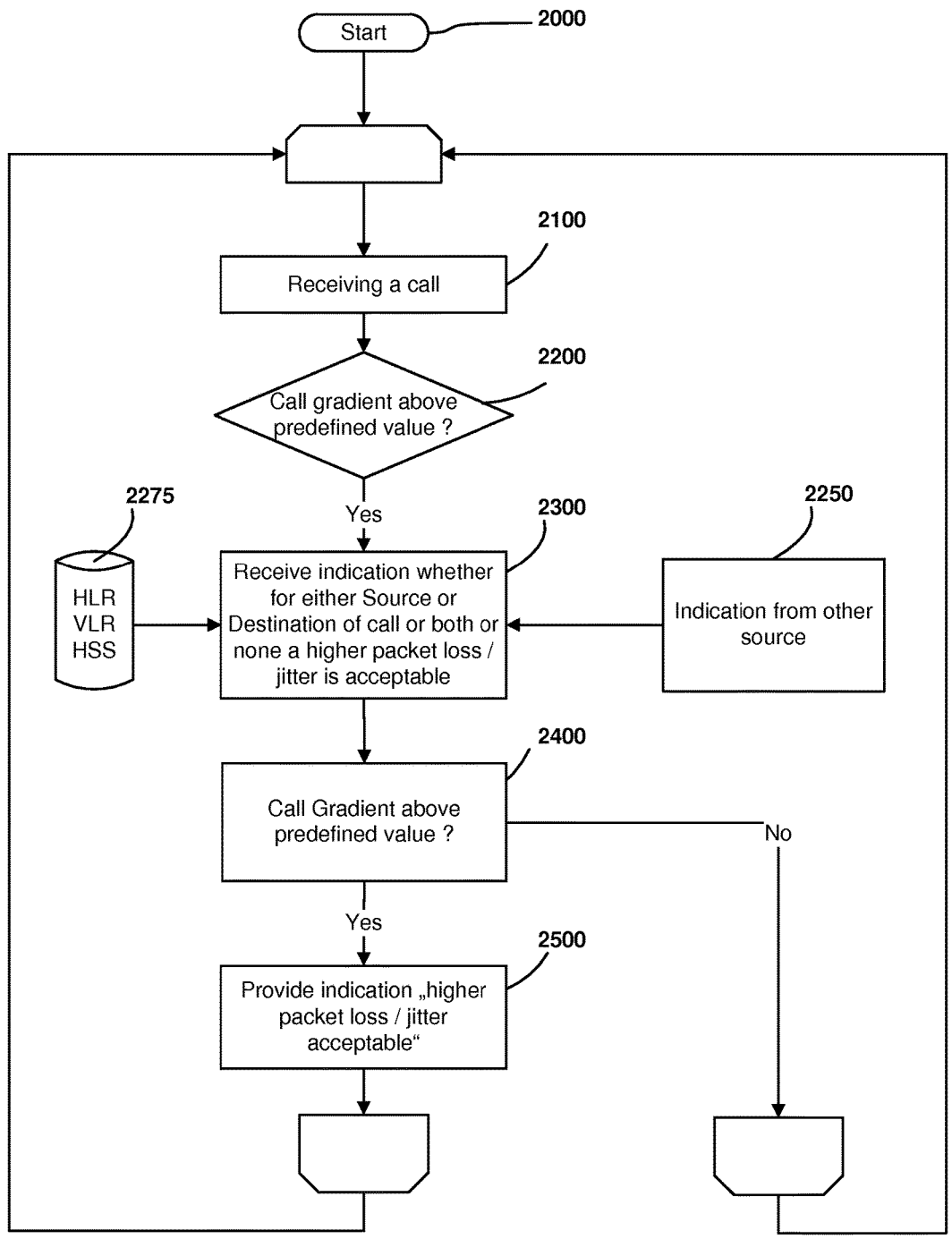
FIG. 4 a further flow chart illustrating further embodiments of method steps of the invention performed by a Mobile Switching Center Server.
Figure 5:
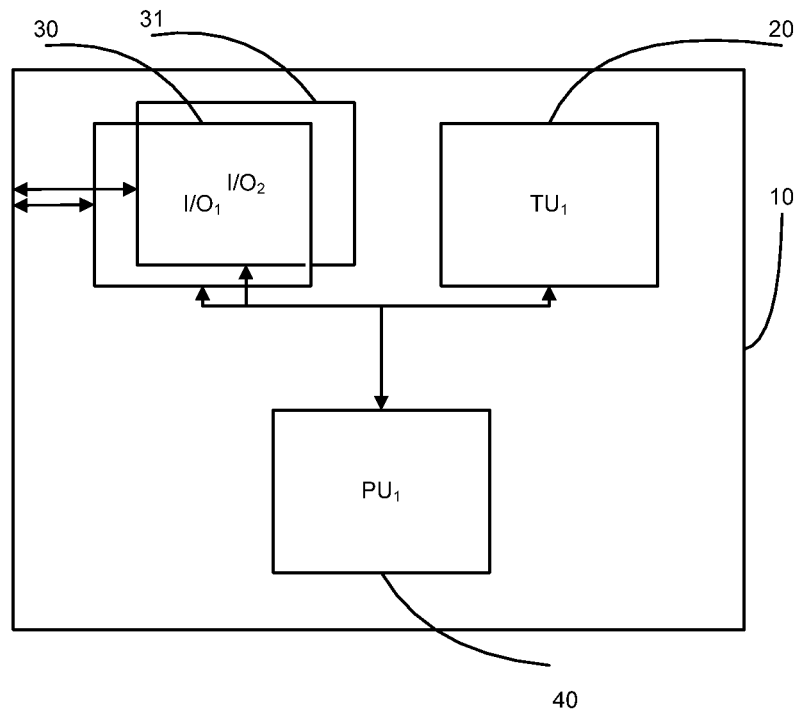
FIG. 5 and FIG. 6 showing block diagrams illustrating embodiments of network nodes according to the invention.
Figure 6:
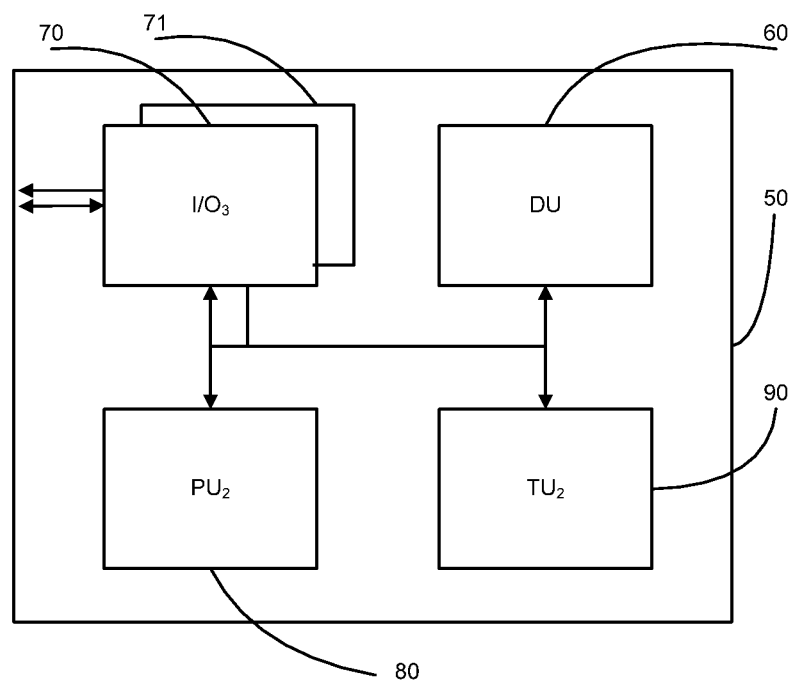

Secondly, a subscriber and/or destination based detection will be illustrated by means of FIG. 4.

In said method, once a call set-up is received in a step 2300, it is determined whether for either the source of the call or the destination of the call, a higher packet loss and/or jitter is acceptable. The information might be stored in an internal or external database such as a Home Location Register, a Visitor Location Register or a Home Subscriber Server.

For example, if the subscriber is a premium customer, then this might be used as an indication that a higher packet loss is not acceptable, i.e. the call needs to be transferred via a second backbone 9 which offers a better quality but which would not be used for an ordinary subscriber since the usage of the second backbone might involve higher costs, e.g. it is a backbone of another provider. In the above case one could assume that at a certain point in time an indication of an internal source instructs that a higher packet loss and/or higher jitter is acceptable while an indication from an external source indicates that for the subscriber high reliability is required.

In another example, if the indication from the external source is that the call is an emergency call, e.g. the destination is an Emergency number and/or the source is a security agent than the call might be as well routed through a second backbone 9 in order to ensure that the emergency call will get through.

In still another example, if the indication from the external source is that the destination is a low quality service such as a poll, announcement, then the call might be admitted even if the packet loss and/or jitter is above a predefined value.

If it is decided in step 2400 that a higher packet loss and/or higher jitter is acceptable then it is proceeded to step 2500 where an indication that a higher packet loss and/or higher jitter for the call is acceptable is provided towards the corresponding Media Gateway.

This indication might be included in any appropriate message sent towards the Media Gateway, e.g. a GCP message, e.g. any appropriate GCP command message such as an add, modify or move command.

In a further embodiment, both methods as illustrated above can be combined as envisaged in step 2200 of FIG. 4, i.e. if the call gradient is above a predefined value, the Mobile Switching Service Center may use this information as well for an enhanced control of providing said indication as indicated in step 2400.

In such a combination, the Mobile Switching Center Server checks in step 2200 whether a condition as described in connection with FIG. 3 was detected. If so, the Mobile Switching Center Server may take this global indication for the decision of step 2400 into account.

For example, if there is a disaster and the destination is a poll, than the call might not be admitted while if a call has an emergency destination the call is admitted.

Obviously, also a time based indication can be taken into account by receiving an indication from an external or internal source such as a calendar function as envisaged in step 2250.

Hence, by combining several conditions a very granular control can be established allowing for customer and demand oriented admission control.

As described below for performing the methods as outlined above, the corresponding nodes are provisioned.

In accordance with the above described method a Media Gateway 4,5,6,7 comprises one or more means for connecting 30,31 to a backbone 1,9. Such means can be any kind of network interface $I/O_1$, $I/O_2$. These means for connecting 30, 31 are further adapted to handle a call.

Furthermore, such a Media Gateway 4, 5, 6, 7 comprises processing means 40 adapted to measure a packet loss, e.g. a processor $PU_1$ or an appropriate controller, whereby the processing means 40 are further adapted to notice an indication that a higher packet loss and/or higher jitter is acceptable, and the processing means 40 are further adapted to decide based on said measured packet loss and/or higher jitter and said noticed indication whether said call is admitted to be routed via said backbone 1, 9 even though the packet loss and/or jitter is above a predefined threshold.

In a further embodiment of said Media Gateway 4, 5, 6, 7 said means for connecting to a backbone 1, 9 are further adapted to receive said indication from an external source such as an Mobile Switching Centre Server 2, 3. Typically this indication is within a GCP message, e.g. any appropriate GCP command message such as an add, modify or move command sent towards the Media Gateway.

Furthermore, in another embodiment the Media Gateway may comprise an internal source 20 for providing said indication. Such an internal source may be any kind of a timer TU, such as a Real Time Clock.

Still further said processing means of a Media Gateway 4, 5, 6, 7 are further adapted to route said call through a second backbone 9 further connected to said media gateway 4, 5, 6, 7, e.g. by means of a second Network Interface I/O$_2$.

In accordance with the above described method a Mobile Switching Centre Server 2,3 comprises one or more means for connecting 70, 71 to a backbone 1,9. Such means can be any kind of network interface I/O$_3$, I/O$_4$. Furthermore, said means for connecting 70, 71 are further adapted to receive a call set-up. Furthermore, said Mobile Switching Centre Server 2, 3 comprises means for processing adapted for providing 80 an indication to said Media Gateway 2, 3 that a higher packet loss and/or higher jitter is acceptable e.g. a processor PU$_2$ or an appropriate controller, whereby said means for processing 80 are further adapted to detect that a call set-up should be performed by a Media Gateway 4, 5, 6, 7 even if the packet loss and/or jitter is above a predefined threshold.

In a further embodiment of said Mobile Switching Centre Server 2, 3, said means for processing 80 are further adapted to measure a call gradient by analyzing call set-up events over time, and said means for processing 80 are further adapted to detect that said gradient is above a predefined value.

Still further said means for processing 80 of a further embodiment of a Mobile Switching Centre Server 2, 3 are further adapted to receive an indication that a higher packet loss and/or higher jitter for the originator of said call is acceptable.

And in a further embodiment of a Mobile Switching Centre Server 2, 3 said means for processing 80 are further adapted to receive an indication that a higher packet loss and/or higher jitter for the destination of said call is acceptable.

Although in the above the invention is described with reference to mobile communication system terminology, it is apparent to a person skilled in the art that the above invention could also be employed in a fixed telecommunication system or IP Multimedia Subsystem (IMS), in that Mobile Switching Centre Servers (MSC-Server) would be replaced by a corresponding Telephony Softswitch Servers or Call Session Control Function (CSCF).

Furthermore, a person skilled in the art understands that some or all of the functional entities as well as the processes themselves may be embodied in software or one or more software-enabled unit(s) and/or device(s).

The invention claimed is:

1. A Method for a Media Gateway in connection to a backbone, comprising the steps of: measuring a packet loss or a jitter associated with said backbone, receiving a call when the measured packet loss exceeds a predefined packet loss threshold or when the measured jitter exceeds a predefined jitter threshold for said backbone; detecting an indication associated with the call, wherein the indication is based on a time period associated with the predefined packet loss threshold or the predefined jitter threshold, and wherein the indication indicates that the measured packet loss exceeding the predefined packet loss threshold or the measured jitter exceeding the predefined jitter threshold is acceptable for the call for said time period; based at least partially on the measured packet loss or the measured jitter and said indication associated with the call, deciding whether said call is admitted to be routed via said backbone; and adjusting the Quality of Service (QoS) level for said call when deciding said call is admitted via said backbone.

2. The method according to claim 1, wherein said indication is received from an external source such as a Mobile Switching Centre Server.

3. The method according to claim 1, wherein said indication is received in a Gateway Control Protocol (GCP) message.

4. The method according to claim 3, wherein said indication is a priority value within the GCP message.

5. The method according to claim 3, wherein said GCP message is a context request.

6. The method according to claim 1, wherein said indication is received from an internal source.

7. The method according to claim 1, further comprising routing said call through a second backbone further connected to said media gateway.

8. The method according to claim 6, wherein said internal source is a calendar.

9. A Method for a Mobile Switching Centre Server in connection to a backbone, comprising the steps of: receiving a call set-up request associated with said backbone; detecting that the call set-up should be performed by a Media Gateway even when the measured packet loss is above a predefined packet loss threshold or when the measured jitter is above a predefined jitter threshold for said backbone; and providing an indication associated with the call to said Media Gateway, wherein the indication is based on a time period associated with the predefined packet loss threshold or the predefined jitter threshold, and wherein the indication indicates that the packet loss measurement above the predefined packet loss threshold or that the jitter measurement above the predefined jitter threshold is acceptable for said time period, and further indicating to admit the call via said backbone with a lower Quality of service accordingly, wherein said indication is received in a Gateway Control Protocol (GCP) message.

10. The method according to claim 9, wherein said step of detecting comprises: measuring a call gradient by analyzing call set-up events overtime, and detecting that the call set-up should be performed even when the measured packet loss is above a predefined packet loss threshold and/or when the measured jitter is above a predefined jitter threshold, when said gradient is above a predefined value.

11. The method according to claim 9, wherein said step of detecting further comprises: receiving an indication that a measured packet loss above the predefined packet loss threshold or a measured jitter above the predefined jitter threshold for an originator of said call is acceptable.

12. The method according to claim 9, wherein said step of detecting further comprises: receiving an indication that a measured packet loss above the predefined packet loss threshold or a measured jitter above the predefined jitter threshold for the destination of said call is acceptable.

13. A Media Gateway comprising: means for connecting to a backbone; said means for connecting are configured to receive a call; processing means configured to measure a packet loss or a jitter for said backbone; said processing means are further configured to detect an indication associated with the call, wherein the indication is based on a time period associated with the predefined packet loss threshold or the predefined jitter threshold, and wherein the indication indicates that the measured packet loss above a predefined packet loss threshold or the measured jitter above a predefined jitter threshold is acceptable for said time period; said processing means are further configured to decide based at least partially on the measured packet loss or the measured jitter and said detected indication whether said call is admitted to be routed via said backbone even if the measured packet loss exceeds the predefined packet loss threshold or if the measured jitter exceeds the predefined jitter threshold; and said processing means are further configured to adjust the Quality of Service (QoS) level for said call when deciding said call is admitted to be routed via said backbone, wherein said indication is received in a Gateway Control Protocol (GCP) message.

14. The Media Gateway according to claim 13, wherein said means for connecting to said backbone are further configured to receive said indication from an external source such as a Mobile Switching Centre Server.

15. The Media Gateway according to claim 13, further comprising an internal source for providing said indication.

16. The Media Gateway according to claim 14, wherein said means for deciding are further configured to route said call through a second backbone further connected to said media gateway.

17. A Mobile Switching Centre Server comprising: means for connecting to a backbone; said means for connecting are further configured to receive a call set-up request associated with said backbone; means for processing configured to detect that a call set-up should be performed by a Media Gateway even when a measured packet loss is above a predefined packet loss threshold or when a measured jitter is above a predefined jitter threshold for said backbone; and means for providing an indication associated with the call to the Media Gateway, wherein the indication is based on a time period associated with the predefined packet loss threshold or the predefined jitter threshold, and wherein the indication indicates that the measured packet loss above the predefined packet loss threshold or the measured jitter above the predefined jitter threshold is acceptable for said time period, and further indicating to admit the call via said backbone with a lower Quality of service accordingly.

18. The Mobile Switching Centre Server according to claim 17 wherein: said means for processing are further configured to measure a call gradient by analyzing call set-up events over time; and said means for processing are further configured to detect that the call set-up should be performed even if the measured packet loss is above a predefined packet loss threshold or if the measured jitter is above a predefined jitter threshold if said gradient is above a predefined value.

19. The Mobile Switching Centre Server according to claim 17 wherein said means for processing are further configured to receive an indication associated with the call indicating that a packet loss above the predefined packet loss threshold or a jitter above the predefined jitter threshold for an originator of said call is acceptable.

20. The Mobile Switching Centre Server according to claim 17 wherein said means for processing are further configured to receive an indication associated with the call indicating that a measured packet loss above the predefined packet loss threshold or a measured jitter above the predefined jitter threshold for a destination of said call is acceptable.

* * * * *